April 22, 1969   H. J. SHOCKEY   3,440,121
METHOD FOR BEDDING PANELS INTO FRAMES
Filed March 9, 1966   Sheet 1 of 3

Inventor:
HOWARD J. SHOCKEY
By
Wilson, Settle, Batchelder
ATT'YS.   & Craig

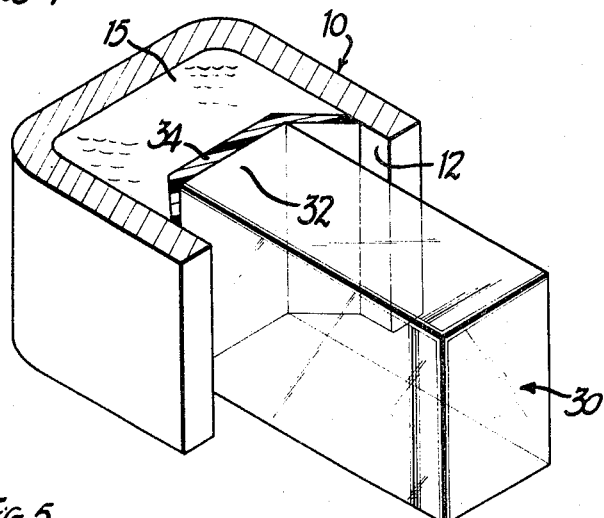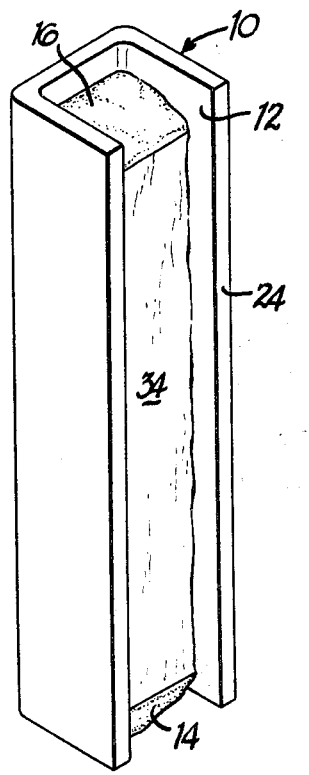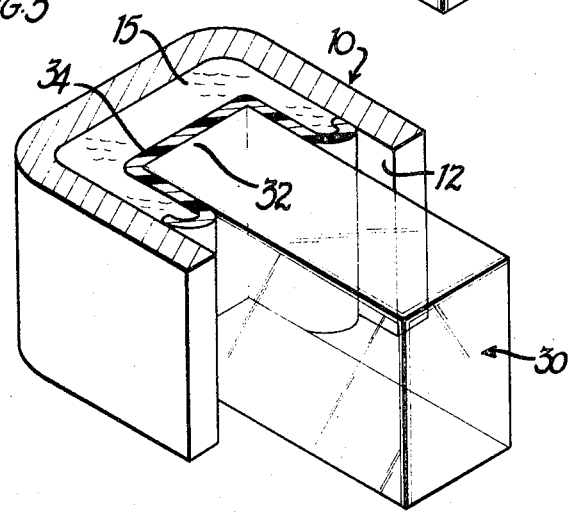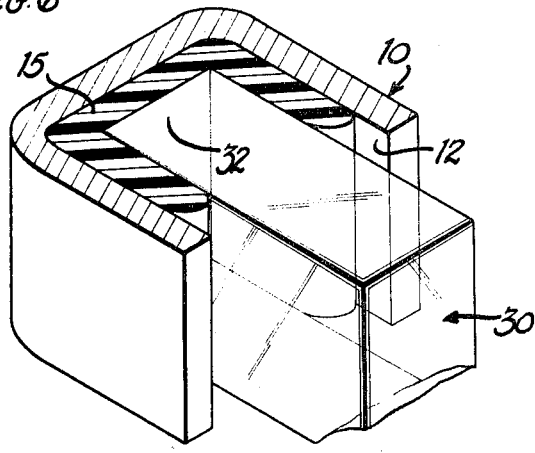

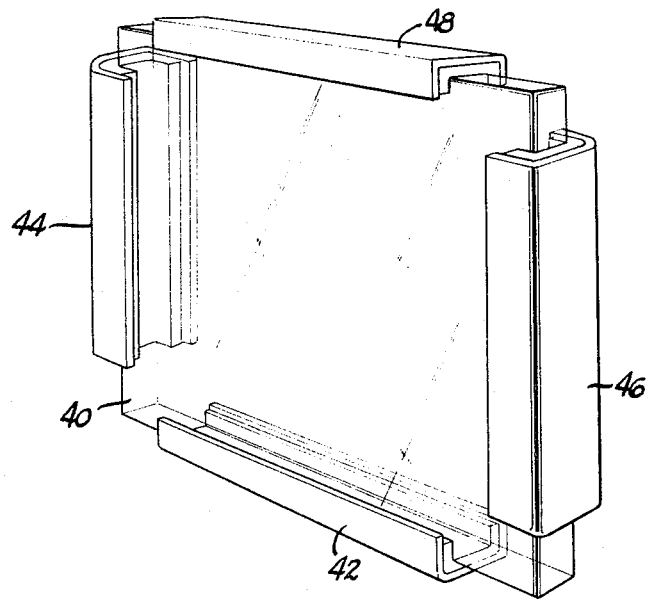
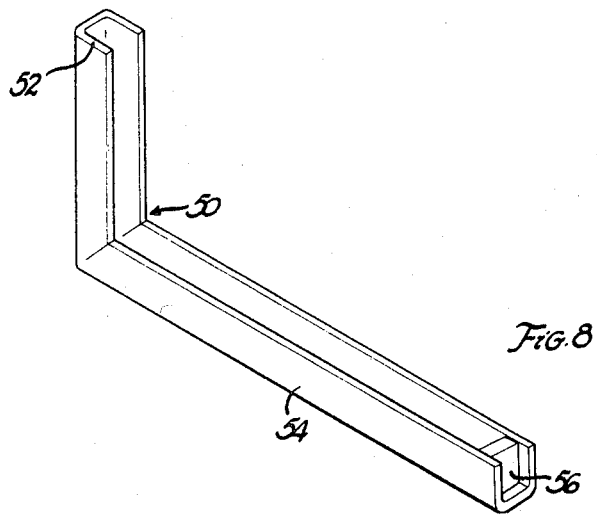
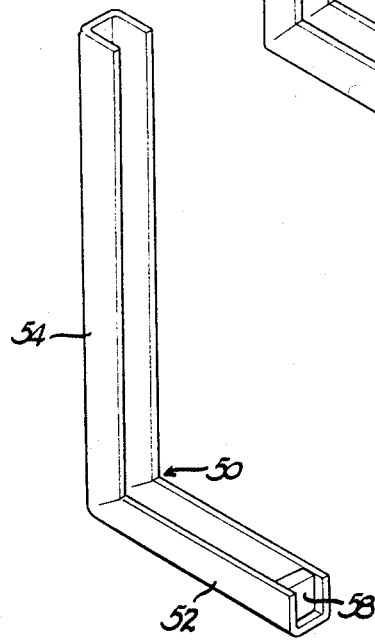

United States Patent Office 3,440,121
Patented Apr. 22, 1969

3,440,121
METHOD FOR BEDDING PANELS INTO FRAMES
Howard J. Shockey, Elkhart, Ind., assignor to Excel Corporation, Elkhart, Ind., a corporation of Indiana
Filed Mar. 9, 1966, Ser. No. 533,071
Int. Cl. B29c 11/00, 27/16
U.S. Cl. 156—293                                     10 Claims This application is related to a co-pending application of Robert J. Deisenroth, Ser. No. 222,590, filed on Sept. 10, 1962, now U.S. Patent No. 3,263,014, and assigned to the present assignee.

This invention relates to methods of bedding a panel into a frame, and more particularly to a method of bedding wherein a skin is formed on liquid bedding material in a frame by a flash heating step, which skin allows the frame to be repositioned for assembly with a panel without spilling the liquid material.

One known way of bedding glass into a frame involves the use of strips of rubber. A worker covers an edge of a pane of glass with a strip of oil coated unvulcanized rubber and inserts the rubber covered edge into a frame. Any excess rubber is manually trimmed off. Different thicknesses of rubber may be used to accommodate different glass thicknesses.

Largely because of the relatively high labor costs of this manual method, it has been proposed to mechanize the method. However, the use of different tape thicknesses and the trimming off of excess material are difficult to automate, and no method of this type has been successfully mechanized.

It has been proposed to bed glass panels in metal frames by injecting liquid bedding material between the frame and panel and subsequently curing the liquid to a solid form. This method has many advantages over the method using rubber strips. It automatically compensates for variations in glass thickness, does not require trimming, is a clean procedure and does not require washing or cleaning of the glass and frame assembly, and provides a watertight seal without the use of additional sealers. A method of this type is described in a co-pending application of Robert J. Deisenroth, Ser. No. 222,590, filed Sept. 10, 1962, which has matured into the above-mentioned U.S. Patent No. 3,263,014, and is assigned to the assignee of this application, and reference may be made thereto for additional information on the method.

When liquid bedding material is injected into a frame, either before or after the edge of the panel is inserted into the frame, some precautions must be observed in handling the assembly to prevent the liquid from spilling. The need for such precautions can limit the application in which the method is used. For example, it may be desirable to frame both a top edge and a bottom edge of a panel at the same time. However, in order to do this the frame at the top edge would have to be inverted relative to the frame at the bottom edge, and liquid would simply run out of the inverted frame. The same result would occur if a vertical side edge and the bottom edge of a panel were framed at the same time.

In the method of the present invention, a frame member having a channel-section is first dammed and partially filled with liquid bedding material. The liquid bedding material is then briefly exposed to a high temperature to partially cure and solidify only a skin layer at the surface of the material. This skin layer acts as a casing for the underlying liquid material which prevents the liquid from running out of the frame if the assembly is placed in a position where the liquid would tend to spill but for the action of the skin layer. When the frame has been placed in a desired position, say a vertically extending position for example, a marginal edge of a panel is inserted into the frame and into the bedding material therein until the panel is closely spaced from the channel surface of the frame. In this step, the edge of the panel deforms the skin layer stretching it to the point where it may ultimately burst. However, the liquid bedding material does not run out of the frame because of the relatively high viscosity of the material, the close spacing of the panel edge of the frame, and surface tension and friction forces tending to inhibit the liquid from flowing. After the frame and panel have been assembled in this manner, the assembly is placed in an oven or the bedding material is otherwise heated so as to cure the liquid bedding material to a solid form wherein it adheres to the frame and to the panel, thus providing a resilient bed for the panel in the frame.

It is evident that by forming a skin layer on the liquid bedding material after it has been introduced into the frame, it is possible to handle the filled frame much more freely than could be done if no skin layer were formed. The frame may be put in any position and the liquid will not run out. Because of this feature, more than one edge of a panel may be frame at the same time. There are many possibilities, but by way of example, one frame may be placed on a top edge of a panel in an inverted position at the same time that another frame is placed on a bottom edge of the panel in an upright position. A frame might be placed on a vertical side edge along with one or both of the horizontal frame just referred to. Thus, the invention provides a high degree of flexibility in the way that the frame with liquid bedding material therein may be handled.

Accordingly, it is an object of the present invention to provide a method of bedding a panel into a frame in which a solid skin layer is formed on liquid bedding material introduced into the frame so as to keep the liquid from running out of the frame when it is handled.

Another object of the invention is to provide a method of bedding a panel into more than one frame at the same time.

A further object of the invention is to provide a method of bedding wherein a skin layer is formed on the surface of liquid bedding material by briefly exposing the liquid to a high temperature so that only a skin layer at the surface thereof is partially cured.

Other objects of this invention will appear in the following description and appended claims, reference being had to the accompanying drawings forming a part of this specification wherein like reference characters designate corresponding parts in the several views.

On the drawings:

FIGURE 3 is a perspective view showing the frame in a vertically extending position wherein the skin layer keeps the underlying liquid material from running out of the frame;

FIGURE 4 is a fragmentary perspective view showing the edge of a glass panel being inserted into the frame and into the bedding material therein;

FIGURE 5 shows portions of a frame and panel assembly after the panel has been fully inserted into the frame;

FIGURE 6 shows the frame and panel assembly after the bedding material has been fully cured;

FIGURE 7 is a view of a window sash having frame members on the sides, top and bottom of the glass;

FIGURE 8 is a view of an L-shaped frame member positioned for introducing liquid bedding material into one leg of the frame;

FIGURE 9 shows the L-shaped frame with the other leg in a horizontal position for introducing liquid bedding material into the horizontal leg.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
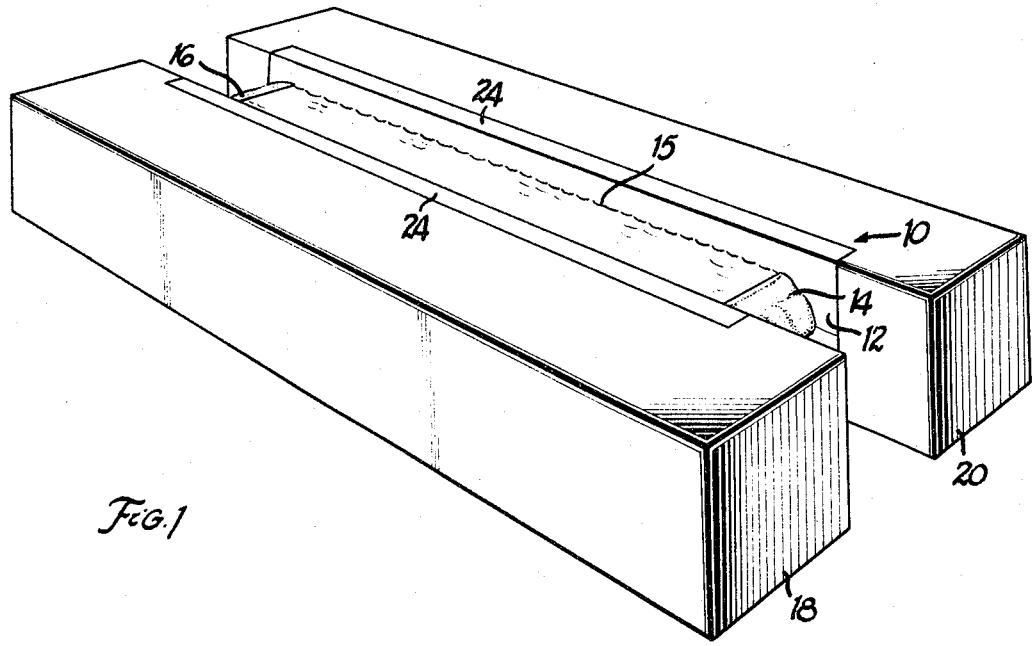
FIGURE 1 is a perspective view of a frame member partially filled with liquid bedding material.

As shown on the drawings:

Referring first to FIGURE 1, there is shown a frame member 10 having a channel shape in section and having an interior channel surface 12 forming a recess in which a panel may be bedded. The recess is dammed at both ends of the frame 10 by solid masses 14 and 16 of pliable damming material which extend transversely across the channel surface 12 and fill the recess thereof at the damming locations. The damming bodies 14 and 16 convert the frame member 10 into a container which can hold liquid in the space between the damming bodies. The damming bodies are preferably made of a clay-like substance which can be deformed but will hold a shape. The recess of frame 10 has already been partially filled with liquid bedding material 15 to FIGURE 1. The liquid bedding material is a resinous substance which can be cured to a solid condition by heat. In its solid condition, the bedding material is adherent both to the frame member 10 and also to the panel which is to be inserted therein. The bedding material has a number of other properties also which will be described more fully herein.

Figure 2:
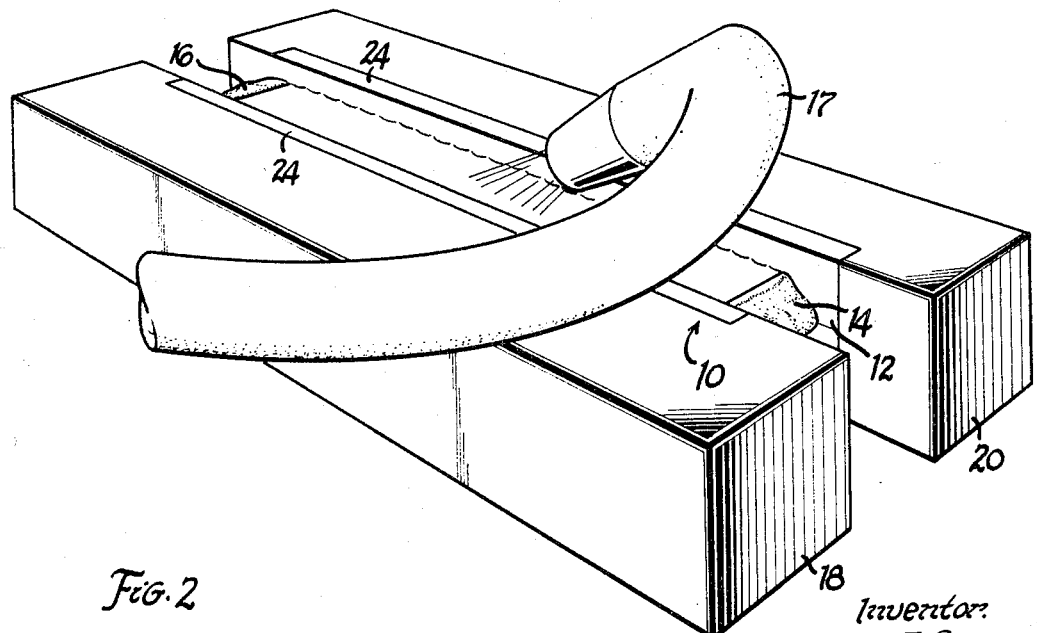
FIGURE 2 is a perspective view similar to FIGURE 1 but showing a jet of hot air being applied to the surface of the liquid so as to partially cure only that surface and thus form a skin layer on the liquid.

In the next step of the method shown in FIGURE 2, a jet of hot air is directed by means of a nozzle 17 at the surface of the liquid bedding material in frame 10 so as to briefly heat the surface and thus partially cure it to form a flexible skin layer 34 in the nature of a membrane at the surface of the bedding material. The hot air may have a temperature of about 350° F., and it is simply played over the surface of the liquid bedding material to briefly heat that surface. The surface material does not fully cure, but does provide a partially cured elastomeric membrane which encases the underlying liquid bedding material. Once the skin layer or membrane has been formed, the frame member 10 may be handled much more freely; that is, it may be moved to a position wherein the liquid material would flow out but for the restraining action of the skin layer.

The frame member 10 is shown in such a position in FIGURE 3. In this view the frame member has been placed in a vertically extending position, and the only thing keeping the liquid material from running out of the frame is the skin layer 34 which has been formed by the flash heating step and the dams 14 and 16.

In the first stages of the method, the frame member 10 is held by fixture blocks 18 and 20 which are recessed both laterally and vertically to provide shelves on which the frame member 10 is seated. The top surface 24 of the side flanges of the frame member are flush with the top surface of the fixture block. The frame member is retained in the fixture blocks at least through the flash heating step as shown in FIGURE 2.

After the frame member has been repositioned, for example, in the upright position of FIGURE 3, the edge of a panel may be inserted into the bedding material within the frame in the manner shown in FIGURES 4 and 5. In FIGURE 4, a vertically extending marginal edge 32 of a glass panel 30 has been partially inserted into the recess of the frame member 10 and into the bedding material therein. The solidified skin layer 34 at the surface of the bedding material is represented by a heavy line. It may be seen that the skin layer is distorted as the panel edge 32 pushes the skin layer ahead of it as it moves into the recess of the frame 10. The skin layer 34 is distorted so that it conforms to the configuration of the edge of the panel, particularly after the panel has been fully inserted to the position shown in FIGURE 5.

While the panel is being inserted into the frame, it also deforms the damming bodies 14 and 16 so that they conform to the configuration of the edge of the panel and keep the channel surface 12 dammed up. The damming bodies and the panel together block the ends of the frame member so that the liquid bedding material cannot run out the ends of the frame.

When the panel is fully inserted, it is spaced only about 0.060 of an inch from the channel surface 12 of frame 10. The dimensions are not to scale in the drawings, but it is to be understood that in FIGURE 5 the edge of the panel is closely spaced from the channel surface of the frame and that the skin layer 34 extends across the edge of the panel and back along its sides. Due to the distortion of the skin layer as the panel is inserted, the skin layer may burst, thus releasing the liquid material which is retained in it. The liquid material does not flow, however, because of surface tension and friction forces acting on it due to the very close spacing between the panel and the frame.

After the glass has been fully inserted, the assembly of panel and frame is heated to fully cure the composite membrane and liquid bedding material into a homogeneous bedding which is bonded both to the metal frame and to the glass panel. This heating step may be accomplished by placing the frame and panel assembly in an oven at a temperature of about 250° F. for about 45 seconds. The heat cures the bedding material 15 to a solid form which is adherent to the frame and the panel, thus providing a resilient bed for the panel in the frame.

The bedding material may be any suitable resinous material which has the following properties:

(1) Resiliency—to provide a suitable bedding for the glass.

(2) Adherence—to provide a bond between the glass and metal frame.

(3) Curability—to a solid state in a relatively short time by the application of heat, for example, within about 45 seconds at about 250° F.

(4) Resistance to weathering (sunlight, temperature changes and moisture absorption).

(5) Mechanical properties such as tensile strength, compressive strength, impact resistance and toughness sufficient to withstand the stress normally encountered in use of the final assembly.

The bedding material may be any suitable thermoplastic or thermosetting plastic material. One class of resins suitable as bedding materials are the polyurethane resins. Polyurethane resins are obtained by the reaction of polyisocyanates with organic compounds containing two or more active hydrogen atoms to form polymers having free isocyanate groups. Under the influence of heat, the free isocyanate groups react to form a thermosetting material. A suitable thermosetting form may be prepared from castor oil and a triisocyanate. A suitable thermoplastic material is polyvinyl resin.

The invention makes it possible to bed a panel into more than one frame at the same time. FIGURE 7 shows an example wherein a panel 40 has been bedded into four frames 42, 44, 46 and 48. One way of assembling the frames with the panel 40 is to start by placing a lower horizontal edge of panel 40 into a horizontally extending frame 42, and place the vertically extending edges of panel 40 into vertically extending frames 44 and 46. The other frame 48 then may be applied to the panel at the top horizontal edge of the panel. The invention makes an assembly operation of this type possible. The liquid bedding material in each frame is provided with a skin layer which encases the liquid material and prevents it from flowing out of the frame; even those frames which are positioned vertically and in an inverted position along the side and top edges of the panel.

Frame members 42, 44, 46 and 48 are prepared in the manner which has been described in connection with FIGURES 1 and 2. The frames are provided with pliable dams 14 and 16 (FIGURE 1) at their ends, and the space between the dams is partially filled with liquid bedding material. This liquid bedding material is then subjected to a jet of hot air at a temperature for example of about 350° F., and the air jet solidifies a skin layer or membrane at the surface of the bedding material. The panel 40 may then be inserted into the frame members in the manner described in connection with FIGURES 4 through 6. Finally, the panel 40 and frames 42, 44, 46 and 48 are placed in an oven at say 250° F. for about 45 seconds to cure the bedding material in each frame to its solid form. Suitable fixturing for the frames may be provided as required.

Referring to FIGURE 8, the frame 50 shown there has two legs 52 and 54 at right angles to each other and liquid bedding material may be placed into these two legs one at a time to prepare it for assembly with a panel. Frame 50 is first supported with leg 54 in a horizontal position and leg 52 in a vertical position. A dam 56 is placed in the recess of leg 54 at its end so that the recess will hold liquid bedding material. Leg 54 is then partially filled with liquid bedding material. The material is briefly heated as by applying a jet of hot air to it so as to form a membrane of elastomeric material at the surface of the bedding material which keeps it from flowing as described previously. The position of the frame 50 is then changed to that shown in FIGURE 9. Here, leg 52 is in a horizontal position and leg 54 extends vertically. Even though leg 54 is in this vertical position, the bedding material does not run out of the frame due to the retaining action of the skin layer or membrane which holds the liquid material in place. A dam 58 is placed at the open end of leg 52, and that leg is then filled partially with liquid bedding material. The material is heated very briefly as with a jet of hot air to form a skin layer on the bedding material which holds it in place. At this stage both leg 52 and leg 54 have liquid bedding material in them retained by a membrane of elastomeric resin. The L-shaped frame 50 may then be placed on a panel in a position wherein the frame's legs receive two edges of the panel. This operation is carried out in a manner very similar to that illustrated in FIGURES 4 through 6 so as to insert both a vertical edge and a horizontal edge of a panel into the frame 50.

The assembly is placed in an oven which, as described previously, may be at about 250° F. The assembly remains in the oven only a short time, say about 45 seconds, and this is sufficient to cure the liquid bedding material to a solid form which is adherent both to the panel and to the frame 50.

The invention provides a method of bedding a panel into a frame which can be positioned during assembly with a panel in a position other than horizontal without having liquid bedding material run out of the frame. By forming a tough skin or membrane at the surface of the liquid bedding material in a frame, the frame being positioned such that the liquid would run out of the frame but for the retaining action of the membrane. By this method, a panel may be bedded into more than one frame at a time with only a single curing step to completely solidify the bedding material in all frames.

I claim:

1. A method of bedding a panel into a frame member having channel surfaces forming a recess to receive a marginal edge of said panel, said method comprising the steps of damming said recess to convert said frame member into a container capable of holding liquid therein, partially filling the recess with a liquid bedding material which is curable by heat to a solid form and which is adherent to the panel and to said channel surfaces in the solid form thereof, briefly heating the bedding material in said frame member to solidify only a skin layer thereof at the surface of the bedding material, the remainder of the bedding material in said frame member remaining in a liquid condition, placing said frame member in a position for assembly with said panel wherein the uncured liquid tends to flow out of said recess but is prevented from so flowing by said skin layer and said dams, inserting a marginal edge of said panel into said recess and into the bedding material therein until it is closely spaced from said channel surfaces, thereby deforming said skin layer and causing it to conform to the configuration of said marginal edge, and heating said bedding material to fully cure the same to said solid form thereof.

2. The method of claim 1 wherein said frame member is initially placed in a horizontal position with said recess facing upward and is changed after said skin layer is formed to a vertical position for assembly with said panel.

3. The method of claim 1 wherein said frame member is initially placed in a horizontal position with said recess facing upward and is changed after said skin layer is formed to a horizontal position wherein said recess faces in a different direction for assembly with said panel.

4. The method of claim 3 wherein in said changed position of said frame member said recess faces downward.

5. The method of claim 1 wherein in said brief heating step said skin layer is only partially cured and is relatively flexible.

6. The method of claim 1 wherein at the time said marginal edge of said panel is inserted into said frame member, a different marginal edge of said panel is inserted into a recess of another frame member having liquid bedding material therein.

7. The method of claim 6 wherein the liquid bedding material in said other frame member has a skin layer prepared by the steps of said method prior to said inserting step.

8. The method of claim 7 wherein the liquid bedding material in both of said frame members is fully cured to a solid condition by a single heating step, thereby bedding said panel into two frame members.

9. The method of claim 8 wherein said two frame members are integral legs of an L-shaped channel-section frame.

10. The method of claim 1 wherein because of the deformation of said skin layer in said inserting step said skin layer bursts, but the liquid therein is prevented from flowing due to surface tension and friction forces and close spacing between said panel and said channel surface.

References Cited

UNITED STATES PATENTS

| | | | |
|---|---|---|---|
| 2,768,475 | 10/1956 | Seelen et al. | 156—109 X |
| 2,938,237 | 5/1960 | Kern et al. | 156—245 X |
| 3,098,698 | 7/1963 | Glynn | 264—261 |
| 3,272,900 | 9/1966 | Ryan et al. | 264—261 X |
| 3,328,223 | 6/1967 | Fink | 156—293 X |

HAROLD ANSHER, *Primary Examiner.*

U.S. Cl. X.R.

264—4, 261, 276, 279